United States Patent
Cheng et al.

(10) Patent No.: US 9,904,971 B2
(45) Date of Patent: Feb. 27, 2018

(54) ADAPTIVE DESAMPLING IN A GRAPHICS SYSTEM WITH COMPOSITED LEVEL OF DETAIL MAP

(71) Applicant: Samsung Electronics Co., Ltd., Suwon-si, Gyeonggi-do (KR)

(72) Inventors: Christopher T. Cheng, Santa Clara, CA (US); Liangjun Zhang, San Jose, CA (US); Santosh Abraham, Pleasanton, CA (US); Ki Fung Chow, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 14/742,322

(22) Filed: Jun. 17, 2015

(65) Prior Publication Data

US 2015/0379688 A1 Dec. 31, 2015

Related U.S. Application Data

(60) Provisional application No. 62/018,307, filed on Jun. 27, 2014.

(51) Int. Cl.
| | | |
|---|---|---|
| *G06T 11/00* | (2006.01) | |
| *G06T 1/20* | (2006.01) | |
| *G06T 3/40* | (2006.01) | |
| *G06T 15/00* | (2011.01) | |

(52) U.S. Cl.
CPC .............. *G06T 1/20* (2013.01); *G06T 15/005* (2013.01); *G06T 2210/08* (2013.01); *G06T 2210/36* (2013.01)

(58) Field of Classification Search
CPC ......... G06T 15/005; G06T 15/80; G06T 1/20; G06T 2210/08; G06T 2210/36
USPC ................................ 345/426, 428, 522, 589
See application file for complete search history.

(56) References Cited

U.S. PATENT DOCUMENTS

| | | | | |
|---|---|---|---|---|
| 2014/0002458 A1* | 1/2014 | Angelidis | ............. | G06T 15/005 345/426 |
| 2015/0170345 A1* | 6/2015 | Vaidyanathan | ........ | G06T 15/503 345/599 |
| 2015/0178983 A1* | 6/2015 | Akenine-Moller | ... | G06T 15/005 345/426 |
| 2015/0287240 A1* | 10/2015 | Janczak | ................ | G06T 15/005 345/522 |

* cited by examiner

*Primary Examiner* — Jin-Cheng Wang
(74) *Attorney, Agent, or Firm* — Lewis Roca Rothgerber Christie LLP

(57) ABSTRACT

In a graphics system regions of a frame are analyzed to determine local regions of the frame in which adaptive desampling may be performed. In one implementation a standard sampling scheme includes at least one sample per pixel and regions that are adaptively desampled have one sample for a block of pixels having a size of at least four pixels. A level of detail map is generating to identify regions in which desampling may be performed. The level of detail map may be based on detecting motion, detecting an edge, and detecting a content frequency.

19 Claims, 10 Drawing Sheets

ADAPTIVE DESAMPLING IN A GRAPHICS SYSTEM WITH COMPOSITED LEVEL OF DETAIL MAP

CROSS REFERENCE TO RELATED APPLICATIONS

The present application claims the benefit of Provisional Application No. 62/018,307 filed on Jun. 27, 2014, the contents of which are hereby incorporated by reference.

FIELD OF THE INVENTION

The present invention is generally related to pixel shading. More particularly, the present invention is directed to analyzing graphics attributes of an image and performing adaptive desampling in order to reduce a number of pixels to be shaded in a graphics processing unit.

BACKGROUND OF THE INVENTION

In a graphics system, power is consumed when executing shaders for processing a graphics application. A graphics application may have many individual shaders, and each pixel shading operation consumes power. Additionally, power is consumed for any accesses to external memory required by the shading process.

A drawback of many graphics processing schemes is that the graphics system often must be designed to support the shading requirements for high end games and other applications requiring high resolution. Thus, the graphics processing unit may consume considerable power even when less complex graphical images are being rendered.

SUMMARY OF THE INVENTION

An apparatus, method, and system is disclosed to provide adaptive desampling in local regions of a graphics frame. A set of graphics attributes is selected that are used to predict a frequency of different regions of a frame prior to rendering a final image. A determination is made whether a sampling rate may be reduced in local regions of a frame prior to rendering a final image. Examples of graphics attributes include motion, the presence of an edge, and content frequency, although other attributes could be included. In one embodiment a level of detail (LOD) map is generated and used to make decisions about a sampling mask to be applied prior to shading.

In one embodiment a method of performing graphics processing includes generating a map identifying local regions of a frame in which a sampling rate is reducible by performing, in individual local regions of an image, at least one threshold test for each graphics attribute of a plurality of graphics attributes indicative of a required sampling rate for a shading operation. Sampling decisions are made for blocks of pixels based on the map whether to reduce a sampling rate below a standard rate of at least one sample per pixel. The image is rendered based on the sampling decisions.

In one embodiment a method of performing graphics processing with adaptive desampling includes analyzing regions of a frame of an image and performing a first threshold test for an edge presence indicative of a required sampling rate, a second threshold test for content frequency indicative of a required sampling rate, and a third threshold test for motion indicative of a required sampling rate. The results of the first threshold test, the second threshold test, and the third threshold test are combined to generate a map identifying pixels of the frame to be rendered at a level of sample resolution reduced below a sample resolution of one sample per pixel. A final image is constructed with sampling based on the map.

In one embodiment a graphics system includes a graphics processing unit. The graphics processing unit analyzes regions of a frame of an image and performs a first threshold test for an edge presence indicative of a required sampling rate. The graphics processing unit analyzes the regions of the frame and performs a second threshold test for content frequency indicative of a required sampling rate. The graphics processing unit analyzes the regions of the frame and performs a third threshold test for motion indicative of a required sampling rate. The graphics processing unit combines the results of the first threshold test, the second threshold test, and the third threshold test to generate a determination of pixels of the frame to be rendered at a level of sample resolution reduced below a standard sample resolution. A final image is constructed based on the determination. In one embodiment the determination is a level of detail map.

DETAILED DESCRIPTION

Figure 1:
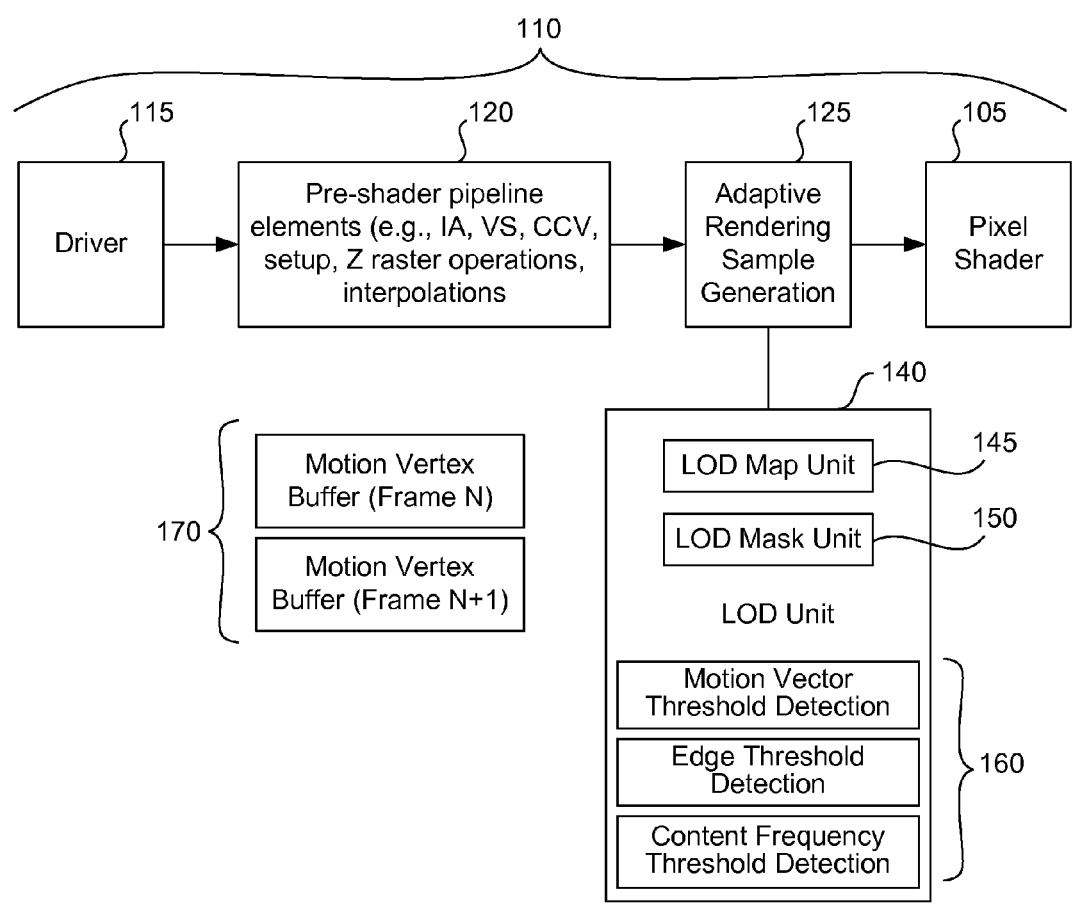
FIG. 1 illustrates a graphics pipeline in accordance with an embodiment of the present invention.

FIG. 1 illustrates a graphics pixel shader 105 of a graphics pipeline 110 in accordance with an embodiment of the present invention. The graphics pipeline 110 may be implemented as a system on a chip or as part of a graphics processing unit (GPU). A driver 115 provides a stream of commands processed in a portion 120 of a graphics pipeline prior to the pixel shader 105 including pipeline elements such as instruction assembly; vertex shading; cull, clip and viewport; setup; z raster operations, and interpolation. An adaptive rendering sampling generation unit 125 provides options for adjusting the sampling within blocks of pixels to support adaptive desampling. As illustrative (but non-limiting) examples options may be provided for a sample mask that samples every pixel at least once, a sampling mask sampling one in four pixels, and a sampling mask sampling one in sixteen pixels. The adaptive desampling is selectable for individual blocks of pixels and may be varied over an individual frame based on analyzing local sampling requirements, such as whether an object in a local region is moving, has a low frequency content, or otherwise has attributes that permit the sampling to be reduced in a local region without significantly reducing visual quality.

In one embodiment a level of detail (LOD) unit 140 is included to generate a level of detail map of an image that indicates pixel regions in which adaptive desampling may be performed. In one embodiment a LOD value in local regions is used to determine whether desampling is performed in local region of pixels and the degree of desampling. In one embodiment each pixel is assigned a LOD value (e.g., LOD0, LOD1, LOD2) and each respective LOD value is associated with a different sampling regime (e.g., sampling once per pixel, sampling one in four pixels, etc.). More generally it will be understood that the LOD value could be assigned on a different based than an LOD value per pixel.

The LOD unit 140 includes a LOD mapping unit 145, which determines a LOD value for each pixel based on performing tests comparing a set of graphics attributes to threshold values 160. Examples of graphics attributes include a motion vector value, attributes associated with an object edge, and attributes indicative of content frequency. A set of LOD values corresponds to the sampling options (e.g., full resolution, one-quarter resolution, one-sixteenth resolution). In one embodiment the LOD unit 140 also includes a LOD mask unit 150. A memory buffer 170 is provided to store vertex information for a previous frame and a current frame from which a motion vector may be calculated.

Figure 2:
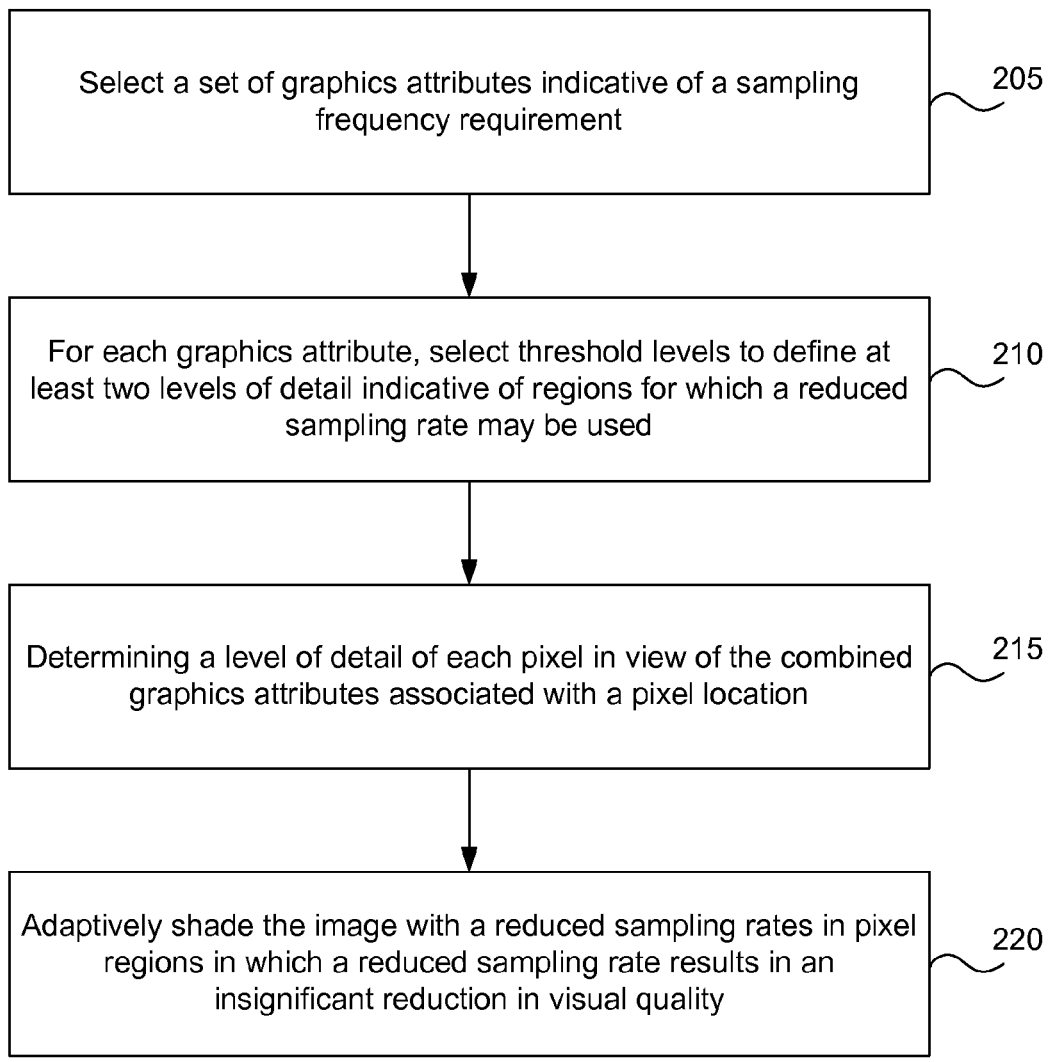
FIG. 2 illustrates a method of performing adaptive desampling in a shading operation in accordance with an embodiment of the present invention.

FIG. 2 is a flowchart of a method in accordance with an embodiment of the present invention. A set of graphics attributes is selected 205 that are indicative of a sampling frequency requirement. For each graphics attribute, threshold levels are selected 210 to define at least two levels of detail indicative of regions where a reduced sampling rate may be utilized. The threshold level may be based on parameters determined by empirical and/or heuristic techniques such that a typical human viewer would have a satisfactory viewing experience when viewing an output frame. That is, a typical viewer would experience an insignificant reduction in visual quality at typical frame rates, taking into account the manner in which the human eye and nervous system responds to a stream of images.

Prior to individual frame undergoing pixel shading, a determination is made 215 of a LOD of each pixel in view of the graphics attributes associated with a pixel location in order to identify regions in which a sampling rate may be reduced. Adaptive shading is then performed 220 in which a sampling rate is reduced in selected regions of the frame. For example, instead of shading every pixel, one pixel in a block of pixels may be shaded to result in a reduced sampling rate (e.g., one in four pixels, one in eight pixels, one in sixteen pixels). In one embodiment the options are normal shading in which every pixel is shading, one-quarter resolution shading, in which one in four pixels are shaded, one-ninth resolution shading in which one in every pixels is shaded in a 3×3 block, one-sixteenth resolution shading in which one pixel in every 4×4 block is shaded, and so on. Interpolation techniques may be used in regions having a reduced sampling rate. For example, if a block of pixels is being desampled, then a single pixel, such as a top left pixel in a quad group of 2×2 pixels may be sampled and liner or bilinear interpolation used to estimate values for other pixels in the quad. In one embodiment the generation of the final image includes performing separate rendering passes based on sampling rate, performing a masking operation to shade only the pixels required for the final image, and reconstructing the final image.

Figure 3:
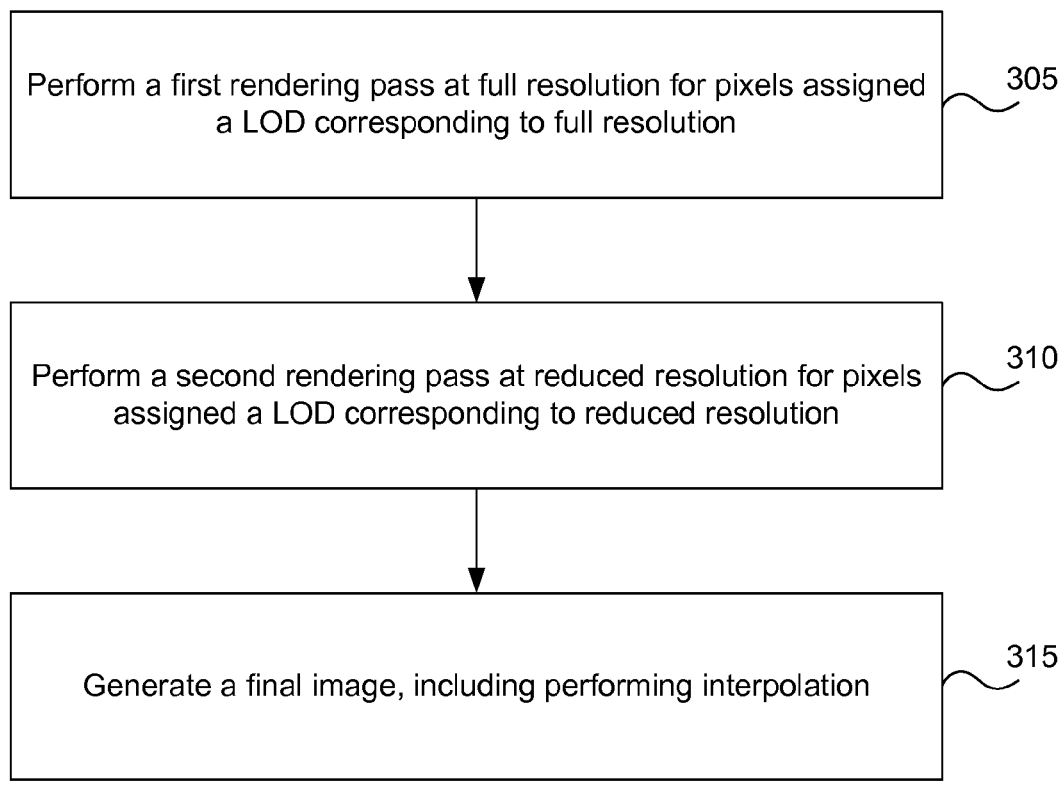
FIG. 3 illustrates a method of using LODs to perform adaptive desampling in a shading operation in accordance with an embodiment of the present invention.

In one embodiment individual images are rendered at each LOD and then used to generate a final image. Referring to FIG. 3, a first rendering pass is performed 305 at full resolution for pixels assigned a LOD corresponding to full resolution. A second rendering pass is performed 310 at a reduced resolution for pixels assigned a LOD corresponding to reduced resolution. A final image is generated 315 from the images generated from the two rendering passes based on the two images including interpolation.

Figure 4:
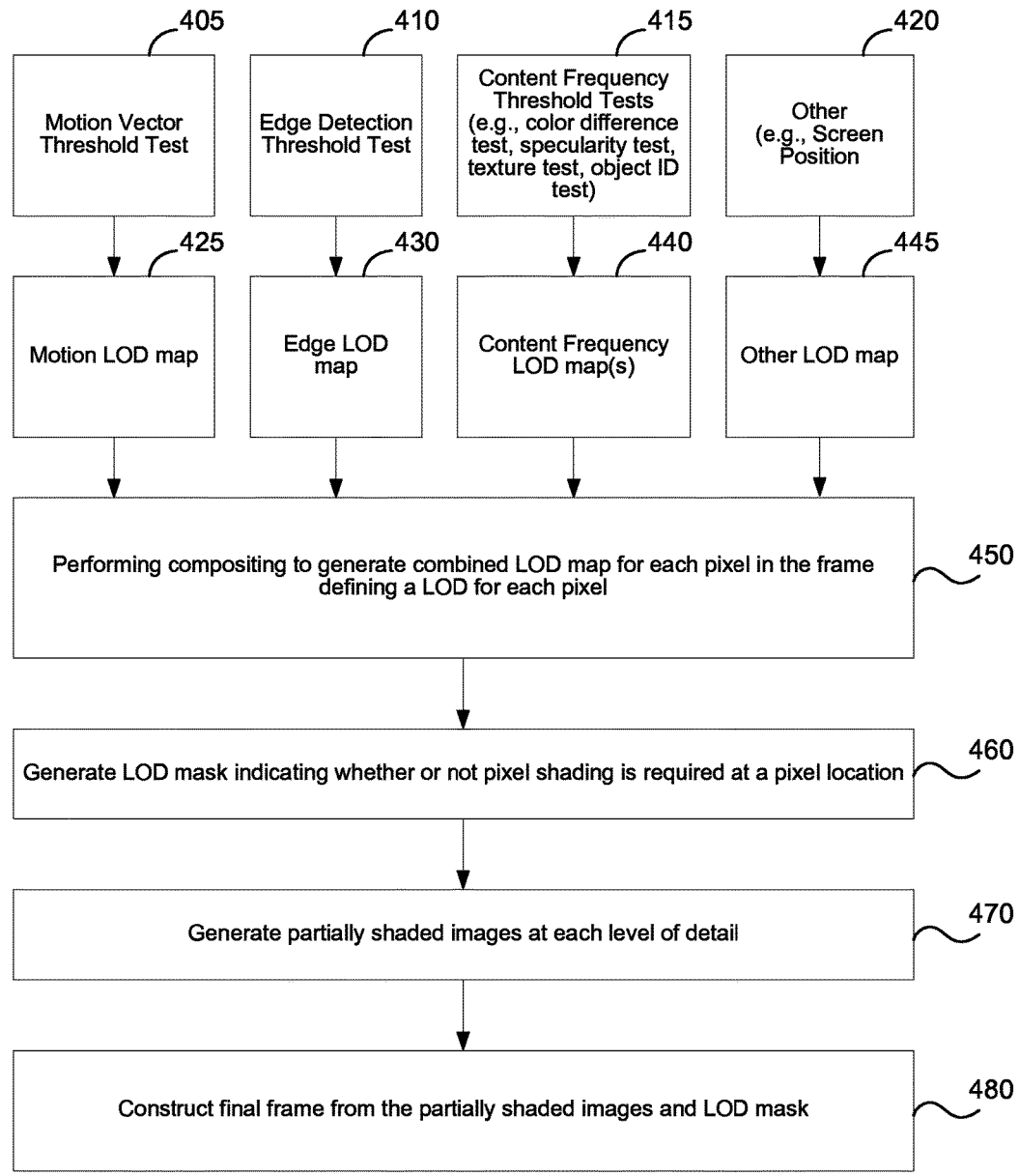
FIG. 4 illustrates a method of using a composited LOD map to perform adaptive desampling in accordance with an embodiment of the present invention.

FIG. 4 illustrates an example of a method in which desampling is based on a combination of individual factors, where a combination of a set of factors corresponds to a situation where adaptive desampling may be performed with acceptable visual quality to a human user. As one example, one criterion is whether an object is moving sufficiently fast (e.g., past a threshold velocity). A motion vector test 405 is performed to compare the pixel motion against one or more threshold values. If the object is moving sufficiently fast, then a human observer may not notice if desampling is performed, particularly if motion blur is applied. A motion LOD map is generated 425 based on the motion vector test 405.

In one embodiment of generating a motion LOD map, a LOD value of 0 or 1 is assigned to each pixel based on its motion vector at each pixel. A frame n the screen space (x, y) of each vertex of a triangle may be stored in a position buffer in memory. In frame n+1, the motion vector of each pixel in a triangle is computed by taking the difference between the (x, y) vertices generated by the raster unit in frame N+1 and then the (x, y) vertices interpolated from the position buffer of each vertex in the triangle in frame N. That is, the screen space displacement between frame n and frame n−1 is calculated and used to perform a threshold motion test.

In one embodiment an edge test 410 is performed. The detection of the presence of an edge may influence whether adaptive desampling may be performed without significantly affecting visual quality. In particular, if an exterior edge is detected, a reduction in sampling rate may not be possible with acceptable visual quality. Alternatively, in some cases the presence of an edge may permit only intermediate degrees of desampling. In one embodiment a depth edge detection is performed to detect edges. An edge LOD map 430 is generated based on the edge detection.

Content frequency may also be used as a test for whether desampling may be performed. Generally speaking abrupt changes in content characteristics tend to correspond to a need for normal resolution to achieve a satisfactory viewing experience. At least one content frequency test 415 is performed and a content frequency LOD map 440 is generated. The content frequency may be tested in various ways. Examples of tests for content frequency include a color threshold test indicative of a change in color, a specularity threshold test, and a texture test to determine whether a high frequency texture is being applied. As another example, an object ID test may be performed to test if the object identifiers of neighboring pixels do not match.

Other tests 420 may also be performed that are indicative of whether desampling may be performed, such as a screen position test in which regions of an image closer to the center receive full resolution and desampling is permitted in regions towards the edge of a frame. A corresponding LOD map 445 is generated for any other relevant tests.

The different LOD maps 425, 430, 440, and 445 are composited to generate a combined LOD map 450 for each pixel a frame in order to define a LOD for each pixel. The LOD map may be stored in a buffer memory. In one embodiment a LOD mask is also generated 460 to indicate whether or not pixel shading is required at a pixel location in order to reduce rendering work performed by the shader. Partially shaded imaged are generated 470 at each level of detail. A final frame is constructed 480 from the partially shaded images and the LOD mask.

Figure 5:
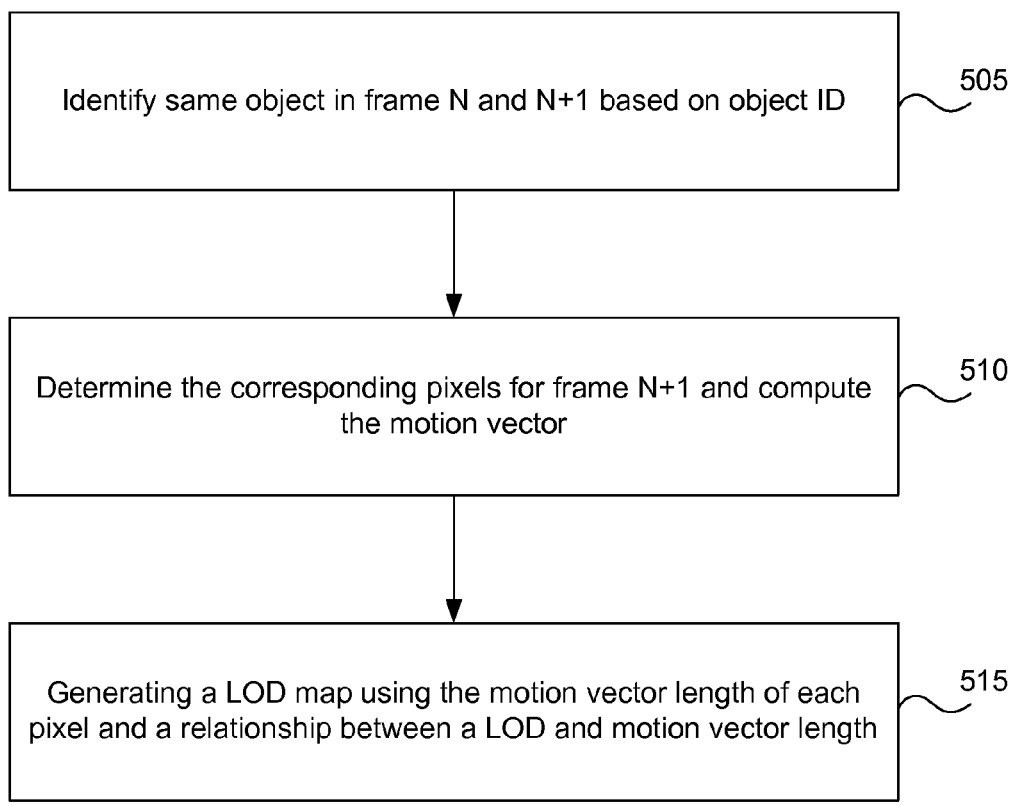
FIG. 5 illustrates a method of generating a motion LOD map in accordance with an embodiment of the present invention.

FIG. 5 illustrates an example of a method of generating a motion LOD map. In the current frame N+1, an identification 505 is made whether an object is the same object as an object in a previous frame. This can be based on an object ID. Interpolation may also be used to aid in determining the screen space coordinates of the vertexes of a triangle in a previous frame. The corresponding pixels are determined 515 for the two frames and a motion vector is calculated for the motion between frames. The motion vector length (magnitude of the motion vector) is calculated and compared against at least one threshold value indicative of a threshold velocity for which sampling at a reduced level can be performed with an insignificant reduction in visual quality. For example, a first threshold may correspond to a first velocity for which a first reduction in sampling rate may be performed. A second threshold may correspond to a second reduction in sampling rate. An LOD map is generated 520 using the motion vector length of each pixel and the relationship between LOD and motion vector length.

Figure 6:
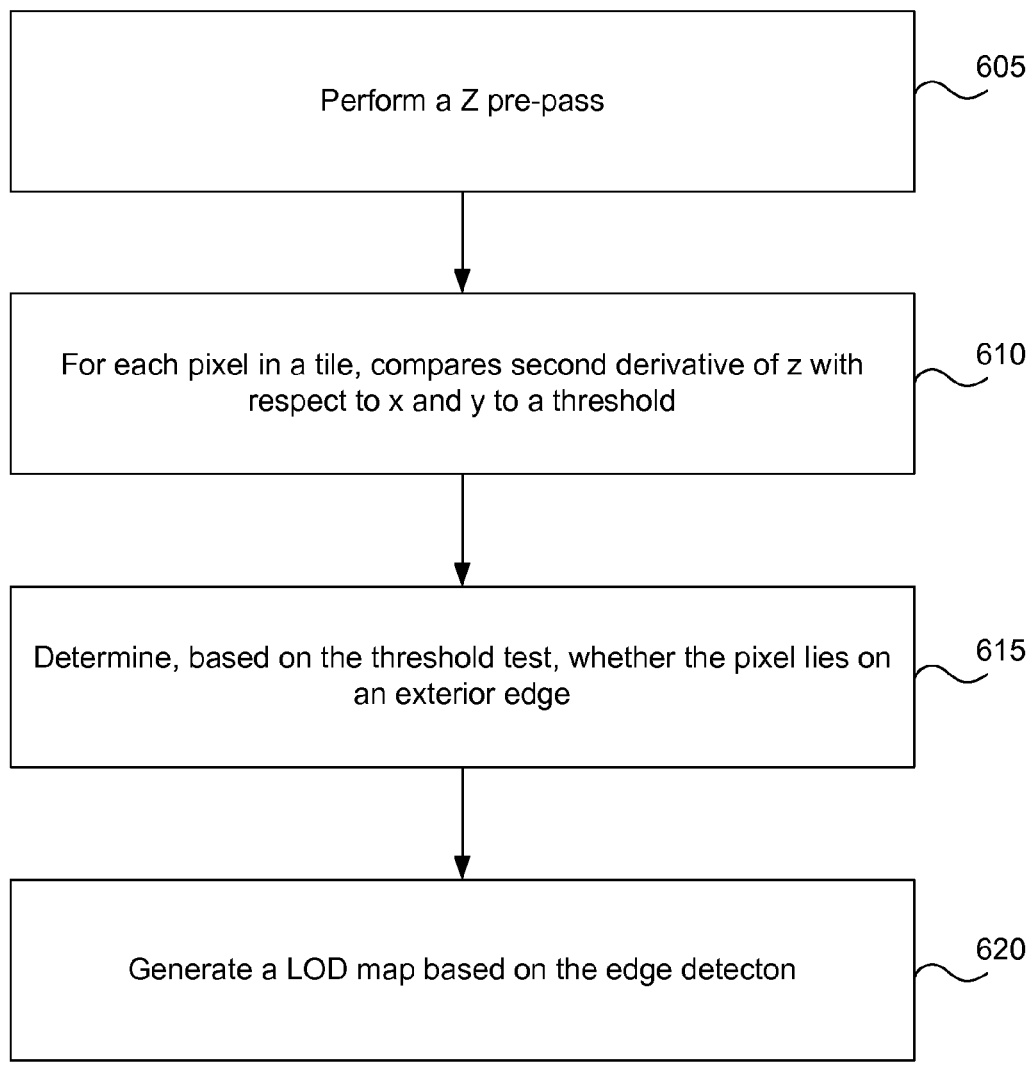
FIG. 6 illustrates a method of generating an edge LOD map in accordance with an embodiment of the present invention.

FIG. 6 illustrates an example of a method of edge detection. A Z pre-pass is performed 605. For each pixel in a tile, the second derivative of z with respect to x and y is calculated and compared to a threshold value 610. A determination is made 615 based on the threshold test whether the pixel lies on an exterior edge. A LOD map is generated 620 based on the edge detection.

Figure 7:
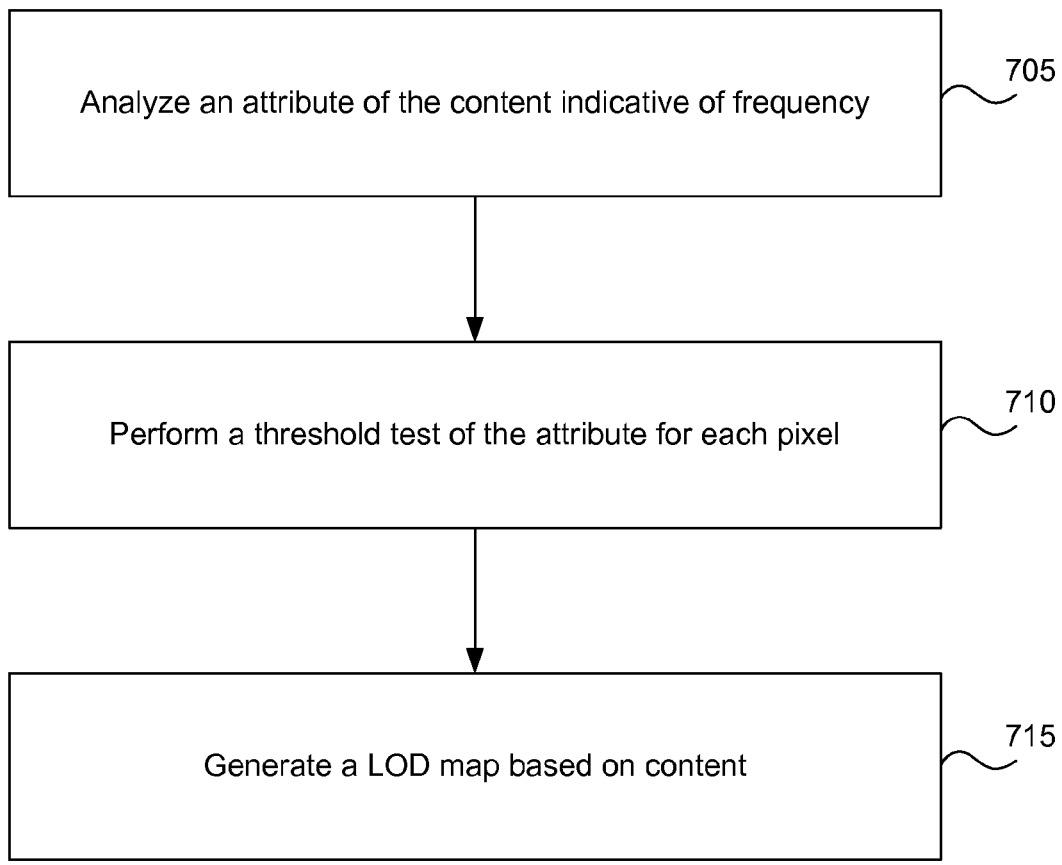
FIG. 7 illustrates a method of generating a content frequency LOD map in accordance with an embodiment of the present invention.

FIG. 7 illustrates an example of a method of generating a content frequency LOD map. An attribute of the content indicative of frequency is analyzed 705. As an example, a pixel may have an associated texture and the texture has an associated frequency based on the characteristics of the texture. A threshold test is performed for each pixel 710. A LOD map is generated 715 for each pixel based on the content.

Figure 8A:
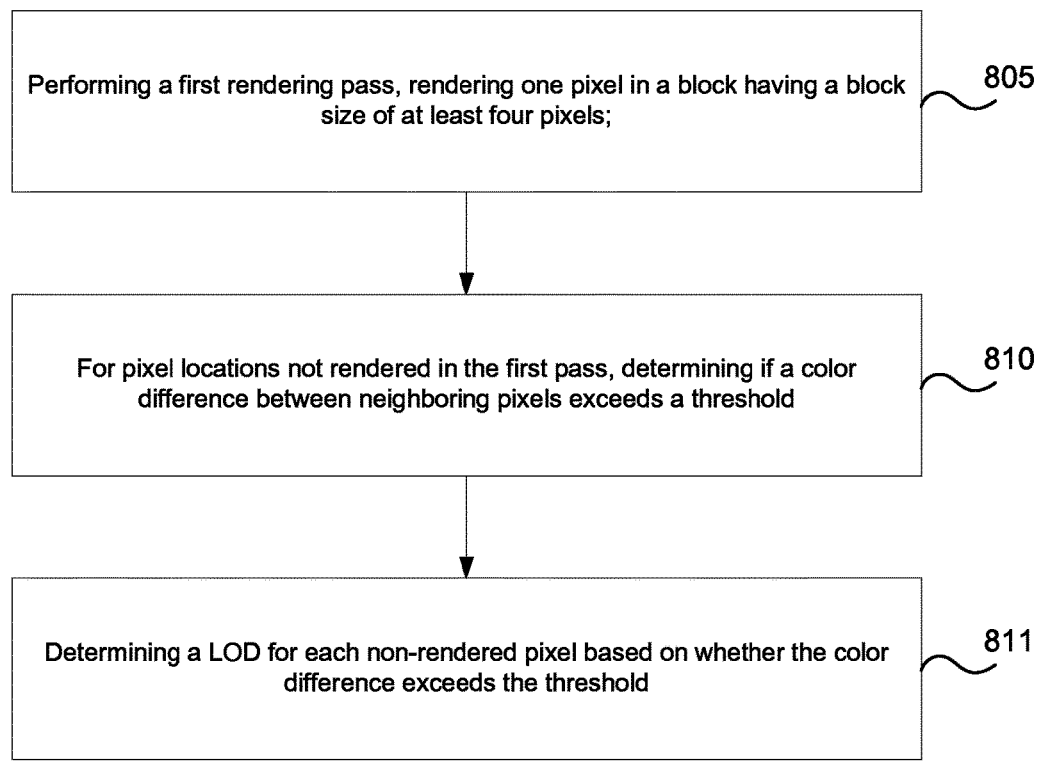
FIG. 8A illustrates a method generating a content frequency LOD map using color thresholding in accordance with an embodiment of the present invention.
Figure 8B:
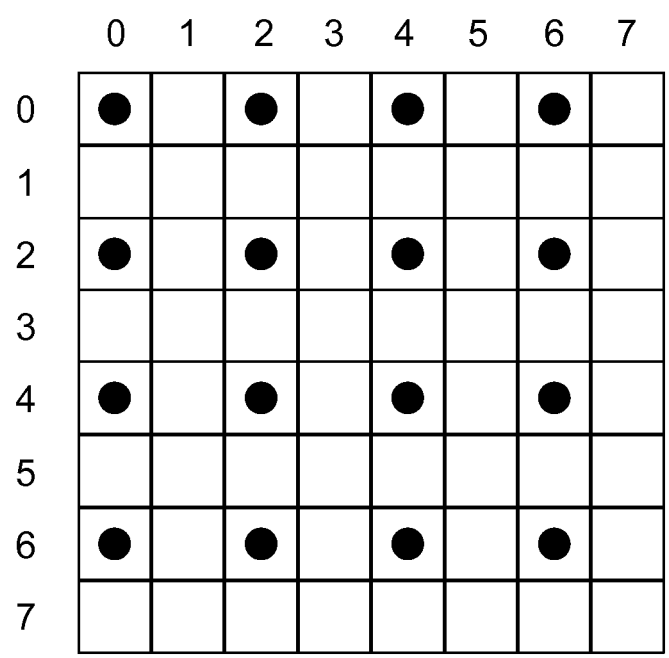
FIG. 8B illustrates aspects of color thresholding in accordance with an embodiment of the present invention.

FIG. 8A illustrates an example of a method of utilizing color thresholding to perform adaptive desampling. In one embodiment a first rendering pass is performed 805 having a default reduced sampling rate, such as one sample for a block of pixels (e.g., a 2×2 or large size block of pixels). For example, referring to FIG. 8B, a pre-selected location, such as a top left corner of a block, may be sampled during the first rendering pass. The result of the first rendering pass is that a subset of the pixels are sampled, as indicated by the circles. For example, a top left corner pixel of each quad group of pixels being rendered in the first pass. In an individual pixel location that has not been rendered, the different in color between neighboring pixels is then compared against a predefined threshold. For example, in FIG. 8B the pixel location (1, 1) has neighbors at (0, 0), (0, 2), (2, 2) and (2, 0). If there is a large difference in color in the neighboring pixels it is indicative of a high frequency. In one embodiment the color difference between two pixels is defined as the L2 (vector norm) Euclidean distance between their red-green-blue vectors, although more generally other color difference formulas could be used.

Figure 9:
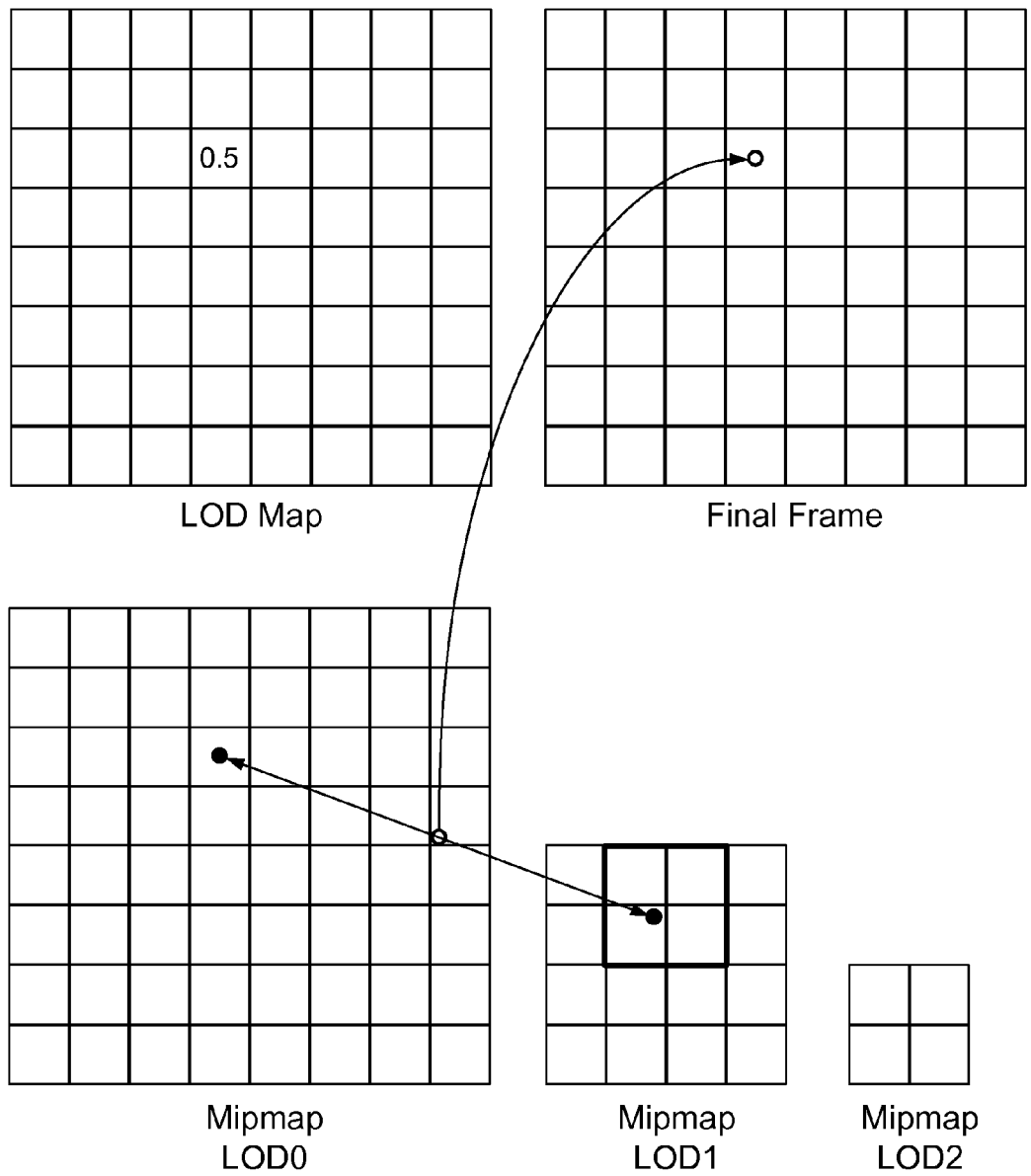
FIG. 9 illustrates aspects of using a composited LOD map to perform adaptive desampling in accordance with an embodiment of the present invention.

One aspect of the LOD maps is that the construction of the final frame may employ techniques analogous to mipmapping. Referring to FIG. 9, a composite LOD map 905 is formed and images are rendered at each level of detail (e.g., LOD0, LOD1, LOD2). The frame is rendered at each LOD. This results in a sequence of images at the different levels of detail, which are analogous to mipmaps. In one embodiment separate bitmasks are generated for each LOD of the LOD map. For example, if there is LOD0 and LOD1, this corresponds to an LOD0 mask and a LOD1 mask. Each LOD mask corresponds to different mip levels from which partially shaded images are formed at the different mip levels. From that generate the final image. The final frame is constructed by using the sequence of frames and the LOD map to filter between the images generated at the different LODs. The images rendered at each level of detail are analogous to mipmaps. In the final frame 910 the value of a pixel is based on interpolation and filtering that is analogous to mipmapping.

The rendering of the sampled pixels can be performed in different ways. In one embodiment a hardware unit selectively renders the sample points by reading in the sample mask. Alternatively the shader can also read in the samples mask as a texture, and only run the actual instructions in the shader if the given pixel is a sample point using an if statement.

In one embodiment the adaptive desampling is performed in a graphics pipeline of a graphics processing unit (GPU). However, more generally the approach may be applied on a CPU implementing a graphics pipeline. The image construction in desampled regions may utilize an interpolation technique, such as bilinear interpolation. Image reconstruction and pixel interpolation in desampled areas can be performed in different ways such as via a hardware rendering pipeline physically as chips, as GPU shader code or just as CPU code.

In one embodiment the adaptive desampling is performed to reduce power consumption in a mobile device application. In some applications, such as mobile device applications, power consumption is a consideration. Performing adaptive desampling in local regions allows the number of samples to be reduced dynamically in local regions of a frame while still maintaining a satisfactory viewing experience. The reduction in sampling reduces the number of shading operations, which in turn reduces power consumption.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of performing graphics processing, the method comprising:
   generating a map identifying local regions of a frame in which a sampling rate is reducible by performing, in individual local regions of an image, at least one threshold test for each graphics attribute of a plurality of graphics attributes indicative of a sampling rate for a shading operation, the graphics attributes comprising a motion vector corresponding to a velocity of a graphics object, content frequency, and graphics object edge presence;
   reducing the sampling rate according to a first reduction when the velocity of the graphics object exceeds a first velocity threshold;
   reducing the sampling rate according to a second reduction when the velocity of the graphics object exceeds a second velocity threshold;
   sampling blocks of pixels, including making a sampling decision for each pixel based on the map to reduce the sampling rate below a standard rate of at least one sample per pixel; and
   rendering the image based on the sampling decision.

2. The method of claim 1, wherein the mapping comprises generating a level of detail (LOD) map indicating a level of detail for each pixel.

3. The method of claim 2, further comprising generating a LOD mask to shade only the pixels of each LOD level required to generate a final image.

4. The method of claim 2, further comprising generating a low resolution rendering of the frame and generated the LOD map based at least in part on the low resolution rendering.

5. The method of claim 2, further wherein the LOD map is generated based at least in part on a full resolution version of a previous frame.

6. The method of claim 1, wherein generating the map comprises:
   generating, for each graphics attribute, a level of detail (LOD) map for each pixel in the frame to form a set of LOD maps in which each LOD map includes at least two different possible levels for each pixel;
   combining each of the LOD maps to form a composited LOD map indicating for each region of the frame a standard shading resolution or a reduced shading resolution;
   generating partial shaded images at each level of detail of the LOD map; and
   constructing a final image from the partially shaded images.

7. The method of claim 1, wherein performing the at least one threshold test comprises performing a first threshold test for the graphics object edge presence, performing a second threshold test for the motion vector, and performing a third threshold test for the content frequency.

8. The method of claim 1, wherein a standard shading resolution includes at least one sample per pixel and a reduced shading resolution comprises one sample for a group of at least four pixels.

9. A method of performing graphics processing with adaptive desampling, comprising:
   analyzing regions of a frame of an image and performing a first threshold test for a graphics object edge presence indicative of a sampling rate;
   analyzing the regions of the frame and performing a second threshold test for content frequency indicative of the sampling rate;
   analyzing the regions of the frame and performing a third threshold test for motion corresponding to a velocity of a graphics object and indicative of the sampling rate;
   combining results of the first threshold test, the second threshold test, and the third threshold test to generate a map identifying pixels of the frame to be rendered at a level of sample resolution that is reduced below a sample resolution of one sample per pixel; and
   constructing a final image with sampling based on the map,
   wherein the reduced level of sample resolution is reduced to a first level when the velocity of the graphics object exceeds a first velocity threshold, and
   wherein the reduced level of sample is reduced to a second level when the velocity of the graphics object exceeds a second velocity threshold.

10. The method of claim 9, wherein the map comprises a level of detail (LOD) map in which each pixel is assigned a level of detail.

11. The method of claim 10, further comprising rendering the frame at each level of the LOD map and constructing a final image based on frames rendered at each level of detail of the LOD map.

12. The method of claim 10, further comprising utilizing a LOD mask to shade only pixels of each LOD level required to generate the final image.

13. The method of claim 10, wherein a standard sample resolution includes at least one sample per pixel and the reduced level of sample resolution comprises one sample for a group of at least four pixels.

14. A graphics system, comprising:
    a graphics processing unit configured to:
    analyze regions of a frame of an image and perform a first threshold test for a graphics object edge presence indicative of a sampling rate;
    analyze the regions of the frame and perform a second threshold test for content frequency indicative of a sampling rate;
    analyze the regions of the frame and perform a third threshold test for motion corresponding to a velocity of a graphics object and indicative of a sampling rate;
    combine results of the first threshold test, the second threshold test, and the third threshold test to generate a determination of pixels of the frame to be rendered at a level of sample resolution reduced below a standard sample resolution; and
    construct a final image with sampling based on the determination,
    wherein the reduced level of sample resolution is reduced to a first level when the velocity of the graphics object exceeds a first velocity threshold, and
    wherein the reduced level of sample resolution is reduced to a second level when the velocity of the graphics object exceeds a second velocity threshold.

15. The graphics system of claim 14, wherein the determination is a level of detail (LOD) map in which each pixel has at least two different possible values for a level of detail.

16. The graphics system of claim 15, wherein the graphics processing unit renders the frame at each level of the LOD map and constructs a final image based on frames rendered at each level of detail of the LOD map.

17. The graphics system of claim 15, wherein the graphics processing unit utilizes a LOD mask to shade only pixels of each LOD level required to generate the final image.

18. The graphics system of claim 14, wherein the standard sample resolution includes at least one sample per pixel and the reduced level of sample resolution comprises one sample for a group of at least four pixels.

19. The graphics system of claim 14, wherein a graphics processing unit includes a LOD mapping unit.

\* \* \* \* \*